(12) United States Patent
Ayres (10) Patent No.: US 7,134,040 B2
(45) Date of Patent: Nov. 7, 2006

(54) METHOD, SYSTEM, AND PROGRAM FOR SELECTING A PATH TO A DEVICE TO USE WHEN SENDING DATA REQUESTS TO THE DEVICE

(75) Inventor: James Francis Ayres, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/124,192

(22) Filed: Apr. 17, 2002

(65) Prior Publication Data

US 2003/0200477 A1    Oct. 23, 2003

(51) Int. Cl.
*G06F 11/00* (2006.01)
(52) U.S. Cl. .................... 714/4; 714/42; 714/3
(58) Field of Classification Search ............... 711/111; 714/4, 3, 42; 710/38
See application file for complete search history.

(56) References Cited

U.S. PATENT DOCUMENTS

| 4,032,899 | A | | 6/1977 | Jenny et al. | |
|---|---|---|---|---|---|
| 4,428,064 | A | | 1/1984 | Hempy et al. | |
| 5,140,691 | A | | 8/1992 | Austruy et al. | |
| 6,032,194 | A | | 2/2000 | Gai et al. | |
| 6,078,960 | A | | 6/2000 | Ballard | |
| 6,145,028 | A | * | 11/2000 | Shank et al. | 710/31 |
| 6,154,852 | A | | 11/2000 | Amundson et al. | |
| 6,173,374 | B1 | | 1/2001 | Heil et al. | |
| 6,182,191 | B1 | * | 1/2001 | Fukuzono et al. | 711/111 |
| 6,195,680 | B1 | | 2/2001 | Goldszmidt et al. | |
| 6,243,360 | B1 | | 6/2001 | Basilico | |
| 6,341,356 | B1 | * | 1/2002 | Johnson et al. | 714/4 |
| 6,434,637 | B1 | * | 8/2002 | D'Errico | 710/38 |
| 6,601,128 | B1 | * | 7/2003 | Burton et al. | 710/316 |
| 6,728,735 | B1 | * | 4/2004 | Fong | 707/204 |
| 6,769,071 | B1 | * | 7/2004 | Cheng et al. | 714/4 |
| 6,775,230 | B1 | * | 8/2004 | Watanabe et al. | 370/228 |
| 6,802,021 | B1 | * | 10/2004 | Cheng et al. | 714/4 |
| 2003/0225950 | A1 | * | 12/2003 | Paul | 710/38 |

OTHER PUBLICATIONS

IBM, "Programmable Track Correction for Tapes", IBM Technical Disclosure Bulletin, Apr. 1965, pp. 997-998.
IBM, "Fail-Over Method for Fast-Write SCSI Adapter", IBM Technical Disclosure Bulletin, vol. 36, No. 06A, Jun. 1993, pp. 161-162.

* cited by examiner

*Primary Examiner*—Robert Beausoliel
*Assistant Examiner*—Marc Duncan
(74) *Attorney, Agent, or Firm*—David W. Victor; Konrad Raynes & Victor LLP (57) ABSTRACT

Provided are a method, system, and program for selecting a path to a device to use when sending data requests to the device. Data requests are submitted to the device on a first path. Device information is maintained indicating a position of a data transfer mechanism of the device that performs the submitted data request. A second path to the device is selected if the first path fails. Data requests are submitted to the indicated position at the device on the selected second path.

37 Claims, 7 Drawing Sheets

Path Table Entry

FIG. 3

Adapter Table Entry

FIG. 4

Device Table Entry

METHOD, SYSTEM, AND PROGRAM FOR SELECTING A PATH TO A DEVICE TO USE WHEN SENDING DATA REQUESTS TO THE DEVICE

BACKGROUND OF THE INVENTION

1. Field of the Invention

The present invention relates to a method, system and program for selecting a path to a device to use when sending data requests to the device.

2. Description of the Related Art

In certain system configurations, a host may include multiple host bus adapters (HBAs) that provide multiple physical paths to a device, such as a dual ported tape device. In the prior art systems, the host would configure two logical paths to connect to the tape device, where each logical device address provides a separate physical path to the tape device. If a host application, such as a backup application, is writing to a tape drive using one logical device address corresponding to a physical path and experiences a failure, such as a permanent path error (e.g., a failure in the HBA or cable), then the application would cease operating down the failed path. In such case, the administrator may initiate a manual failover to restart the application down the alternate path. However, when restarting down the alternate path, the application would have to start operations from the beginning of the set of operations, losing any I/O requests performed prior to the failure. In the prior art, the application must restart from the beginning, because with sequential devices, such as tape drives, the application is not aware of the location on tape being accessed when failure occurred.

The prior art failover techniques that require the application to start operations from the beginning can be quite costly because the host application may have to resubmit a substantial amount of I/O requests from the time the application started using the path, even if the previously submitted read and write operations successfully completed. For instance, if a backup application encounters a failover while backing up a large storage space to the tape driver, where the application may have been performing the backup for several hours, the backup application would have to restart the backup job from the beginning when switching over to the remaining available path.

For these reasons, there is a need in the art for improved techniques for managing operations with respect to sequential devices, such as tape drives.

SUMMARY OF THE PREFERRED EMBODIMENTS

Provided are a method, system, and program for selecting a path to a device to use when sending data requests to the device. Data requests are submitted to the device on a first path. Device information is maintained indicating a position of a data transfer mechanism of the device that performs the submitted data request. A second path to the device is selected if the first path fails. Data requests are submitted to the indicated position at the device on the selected second path.

In further implementations, the data request comprises a sequential access request. In such case, the data request comprises an Input/Output request, the device comprises an Input/Output device, and the data transfer mechanism performs the I/O request with respect to a computer readable medium.

Still further, a command to move the mechanism may be submitted to the indicated position before submitting the sequential I/O requests from the last known completed I/O request.

Yet further, path information may be maintained on paths to the device, wherein the path information is used to select the first and second paths to the device.

Further provided are a method, system, and program for selecting a path to a device. Information is maintained indicating usage by applications of adapters to access at least one device, wherein the adapters provide multiple paths to the device. A request is received from an application to access a target device. The information indicating the usage of the adapters is used to select one path to the target device that utilizes one adapter having a lowest usage. The path the application uses to access the target device is switched to the selected path.

In further implementations, the device comprises a sequential access device.

Described implementations provide techniques for selecting an available path to a device should a path currently being used to access the device fails. Further implementations, utilize techniques to select one of multiple paths to a device that is the least accessed path for applications to use to access the device. In certain implementations, the described techniques are used to select one of multiple paths to a sequential access device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations of the present invention. It is understood that other implementations may be utilized and structural and operational changes may be made without departing from the scope of the present invention.

Figure 1:
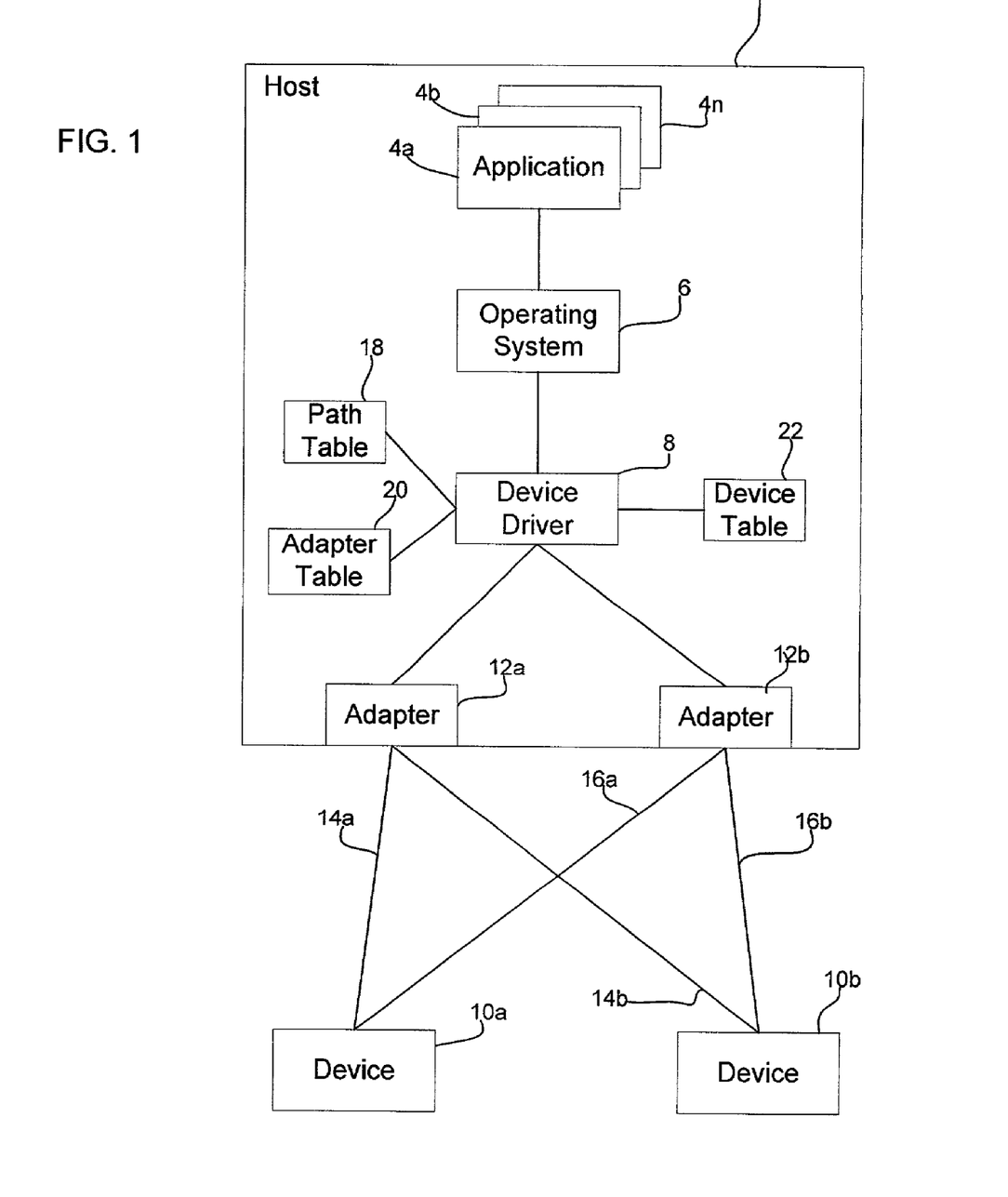
FIG. 1 is a block diagram illustrating a computing environment in which aspects of the invention are implemented.

FIG. 1 illustrates a computing environment in which aspects of the invention are implemented. A host system 2 includes a plurality of application programs 4a, 4b . . . 4n that execute in an operating system 6 environment. A device driver 8 enables communication between the application programs 4a, 4b . . . 4n and devices 10a, 10b. The host 2 includes two adapters 12a, 12b, where each adapter 12a, 12b provides a path to at least one of the devices 10a, 10b. In FIG. 1, each adapter 12a, 12b provides one path to each device 10a, 10b, however, in other configurations an adapter 12a, 12b may provide a connection to only one device 10a, 10b. Adapter 12a provides physical paths 14a and 14b to the devices 10a, 10b, and the adapter 12b provides physical paths 16a and 16b to the devices 10a, 10b. Thus, in FIG. 1 each device 10a, 10b has at least two ports to connect with each adapter 12a, 12b. In alternative configurations, the host 2 may include more than two adapters and each device may include more than two ports to allow for connections with more than two adapters to provide more than two paths to each device. Moreover, there may be more than two devices. The device driver 8 maintains a path table 18 and adapter table 20 that provides information on the paths 14a, 14b, 16a, 16b to the devices 10a, 10b and application usage of the adapters 12a, 12b to access the devices 10a, 10b.

The host system 2 may comprise any computing device known in the art, such as a desktop computer, workstation, server, mainframe, laptop, handheld computer, telephony device, etc. The operating system 6 may comprise any type of operating system. The adapters 12a, 12b may connect to the devices 10a, 10b via a direct cable line or connect through a switched network. The adapters 12a, 12b and devices 10a, 10b may communicate directly or through a network such as a Storage Area Network (using the Fibre Channel protocol), a Local Area Network (using Ethernet), Intranet, the Internet, a Wide Area Network (WAN), etc. Alternatively, the devices 10a, 10b may connect directly to a plug-in bus card or the main circuit board, i.e., motherboard, in the host 2. In certain implementations, the devices 10a, 10b comprise sequential access devices, such as a magnetic tape drive, media changer, tape library, etc.

Figure 2:
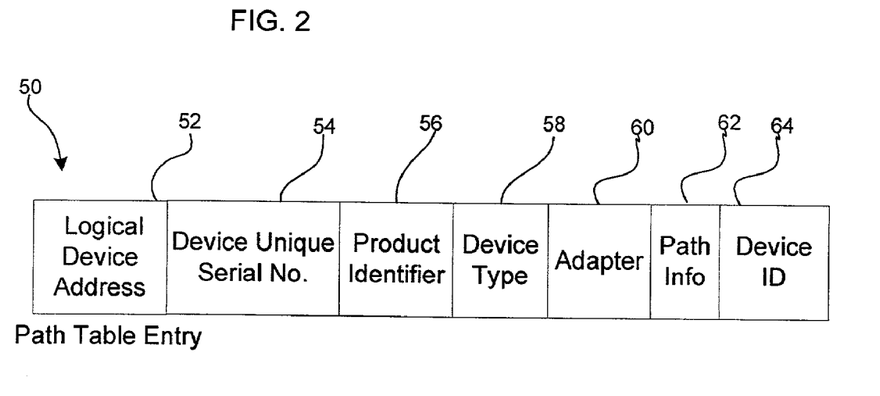
FIGS. 2, 3, and 4 illustrate data structures of entries in tables used in accordance with implementations of the invention.

FIG. 2 illustrates fields in an entry 50 of the path table 18. Each path table 18 entry 50 includes a logical device address 52 providing the logical device address assigned to the path 14a, 14b, 16a, 16b by the device driver 8 during configuration. The device driver 8 may assign a different logical device address for each path to a same device, e.g., a different logical device address for paths 14a and 16a that connect to the same device 10a. A unique serial number field 54 provides a unique identifier assigned to the device 10a, 10b. A product identifier 56 provides a vendor assigned number to the product model and a device type 58 indicates a device type, e.g., tape drive, medium changer, tape library, disk drive, printer, etc. The adapter field 60 indicates the adapter 12a, 12b used to communicate to the device at the logical device address and the path information 62 provides any information needed to physically address the device 10a, 10b and send Input/Output (I/O) requests over the paths 14a, 14b, 16a, 16b, such as a network address, Logical Unit Number (LUN), Small Computer System Interface (SCSI) identifier (ID), etc. A device identifier (ID) field 64 indicates the physical device 10a, 10b that is accessed using the corresponding logical device address 52 on the path indicated in the path info field 62.

Figure 3:
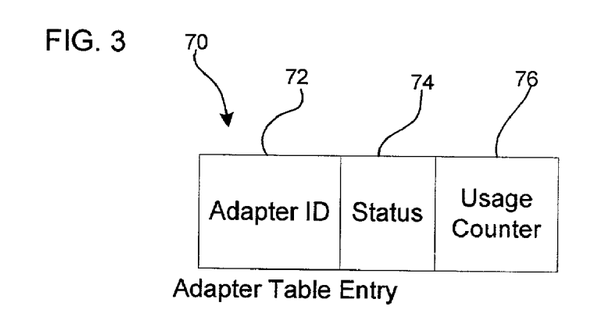

FIG. 3 illustrates the adapter table 20 maintained by the device driver 8 having an entry 70 for each adapter 12a, 12b in the host 2. For each adapter, the entry 70 includes an adapter identifier (ID) field 72 identifying the adapter 12a, 12b in the host 2, a status field 74 indicating whether the adapter 12a, 12b is available or unavailable, e.g., offline. A usage counter 76 indicates the number of applications 4a, 4b . . . 4n that are currently sending I/O requests through the adapter 12a, 12b using a logical device address associated with the adapter 12a, 12b. The usage counter 76 for an adapter may be incremented whenever an application 4a, 4b . . . 4n is granted access to the device on a path including the adapter.

Figure 4:
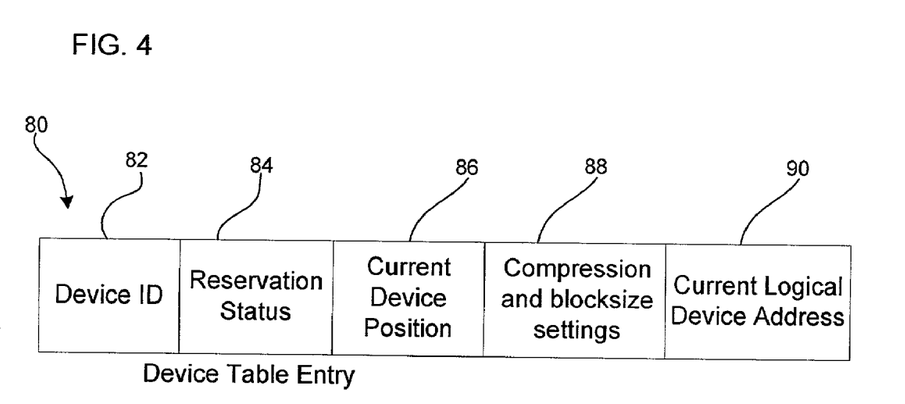

FIG. 4 illustrates fields in an entry 80 in the device table 22 that provides information on each device 10a, 10b to which the host 2 connects. A device identifier 82 identifies the device that is described in the entry 80. A reservation status 84 field indicates the current access level of the device. For instance, for a sequentially accessed SCSI device, such as a magnetic tape drive, processes or applications accessing the device maintain a registration on the device, which is used to determine the access other processes are allowed. For instance, if a process has reserved the tape device, then no other process can write to or change the position of the tape drive head. A current device position field 86 indicates the current position being accessed at the device. For tape devices, the current position indicates the block ID on the tape where the tape head is currently positioned. The compression and blocksize settings 88 indicate the compression and blocksize being used at the tape device. The current logical device address 90 indicates the current path being used to access the device, which is the path indicated in the path info field 62 for the logical device address indicated in field 90. In certain implementations, multiple logical device addresses may be associated with a same device providing multiple paths to that device. In such cases, the current logical device address 90 indicates the logical device address or path currently being used to access the device.

Figure 5:
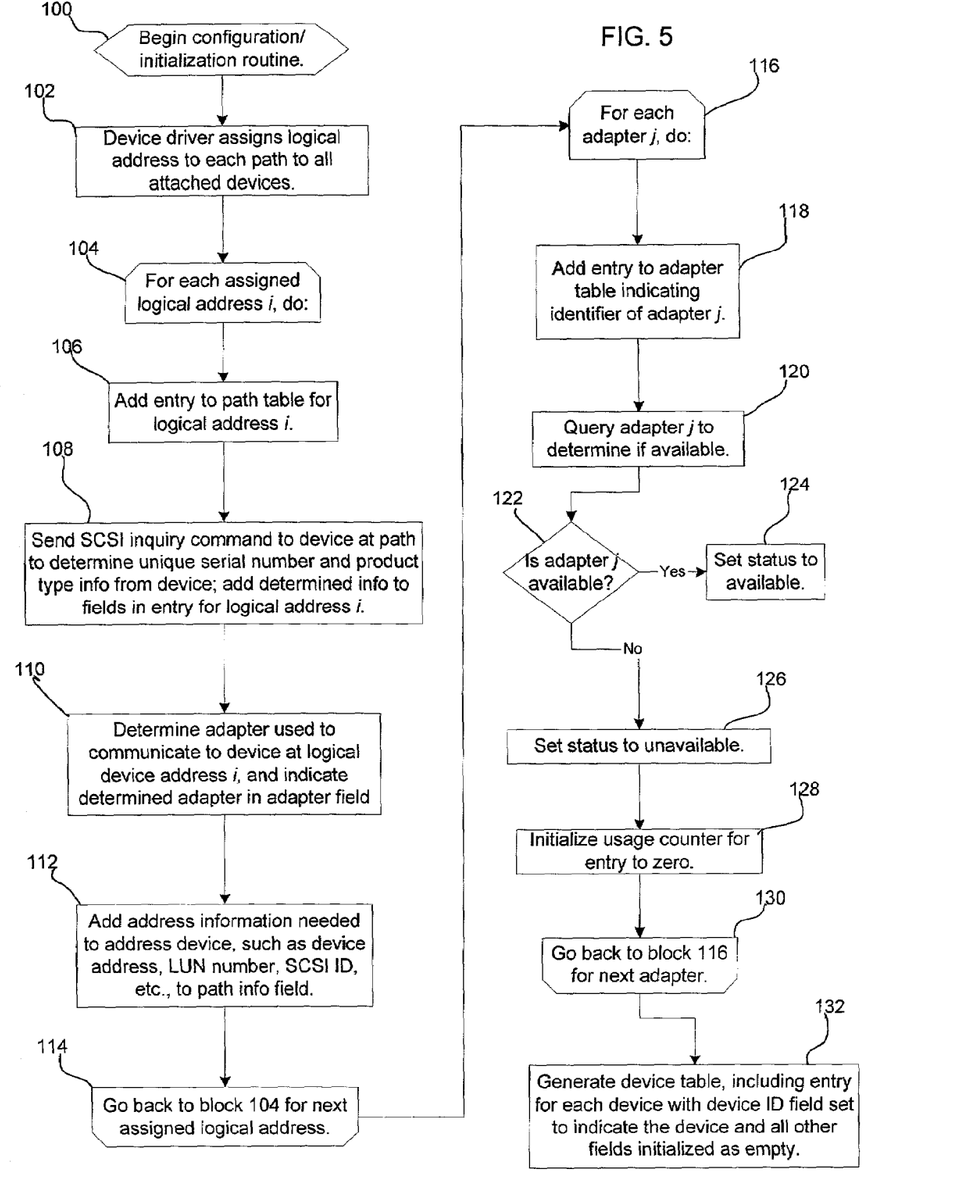
FIG. 5 illustrates logic to initialize the data structure described in FIGS. 2, 3, and 4 in accordance with implementations of the invention.

FIG. 5 illustrates logic implemented in the device driver 8 to generate and populate the path table 18, adapter table 20, and device table 22 during configuration/initialization when the device driver 8 discovers attached devices 10a, 10b and assigns logical addresses to the paths 14a, 14b, 16a, 16b providing a connection from the host adapters 12a, 12b to the devices 10a, 10b. Control begins at block 100 with the configuration/initialization operation. The device driver 8 assigns (at block 102) logical device addresses to each path from each adapter to one attached device in a manner known in the art. Thus, there would be one logical device address assigned to the path to each attached device. For each assigned logical device address i, the device driver 8 performs a loop at blocks 104–114. The device driver 8 adds (at block 106) an entry to the path table 18 for the logical device address i and would add logical device address i to field 52. The device driver 8 sends (at block 108) a SCSI inquiry command to determine the unique serial number 54, product identifier 56, and device type 58 for the device 10a, 10b addressed by the logical device address i and adds the determined unique serial number, product type, and device type information to the corresponding fields 54, 56, and 58, respectively. The information gathered at block 108 may have been determined earlier during configuration. The device driver 8 further determines (at block 110) the adapter 12a, 12b used to communicate to the device at logical device address i, and indicates the determined adapter 12a, 12b in the adapter field 60. Information needed to address the device 10a, 10b assigned to the logical device address i, such as device address, LUN number, SCSI ID, Fibre Channel Arbitrated Loop address, etc., is added (at block 112) to the path information field 62.

The device driver 8 further performs a loop at blocks 116 to 130 for each adapter j 12a, 12b in the host 2. An entry 70 is added (at block 118) to the adapter table 20 for adapter j indicating a unique identifier of the adapter 12a, 12b in the adapter ID field 72. The adapter j is queried (at block 120) to determine if the adapter j is available. If so (at block 122), then the status field 74 is set (at bock 124) to available; otherwise, the status field is set (at block 126) to unavailable. The usage counter 76 is initialized (at block 128) to zero. The device driver 8 would further generate (at block 132) a device table 22 including an entry 80 for each attached device 10*a*, 10*b*, where a unique device identifier (ID) for the device 10*a*, 10*b* is added to the device ID field 82, and the other fields 84, 86, 88, and 90 are initialized to zero or empty. In certain implementations, the device driver 8 may build the device table entries 80 from the entries 50 in the path table 18, such that there is one device table entry 80 generated for each device unique serial number 54 in the path table entries 50. Each device table entry 80 is provided with a unique key or device ID 82, which is then entered in the field 64 of the path table entries 50 to associate the device table entries 80 with the path table entries 50 providing paths to the devices. There may be multiple path table entries 50 having a same device ID 64 to provide multiple paths to a single device.

Figure 6:
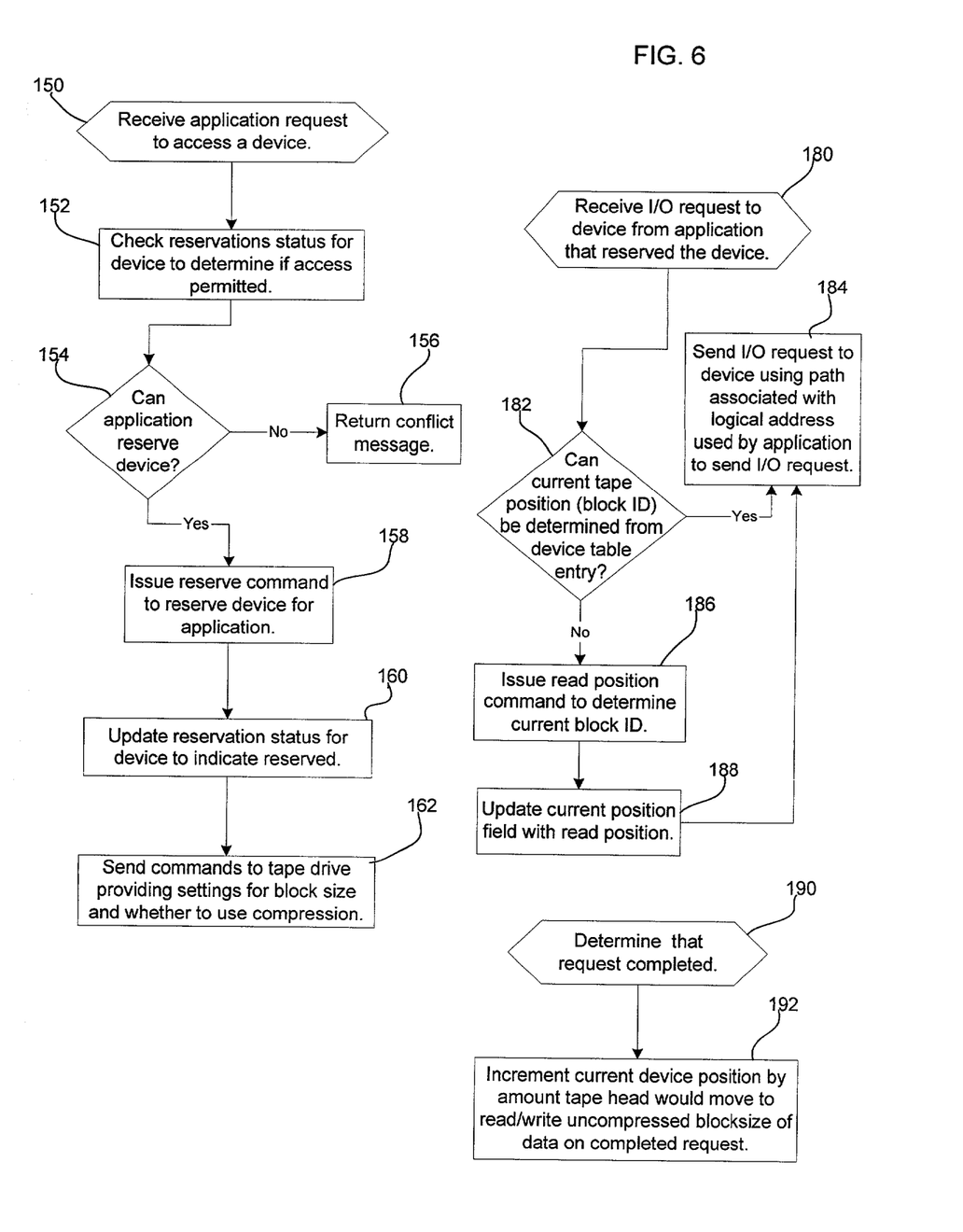
FIG. 6 illustrates logic to provide an application access to a path in accordance with implementations of the invention.

FIG. 6 illustrates logic implemented in the device driver 8 to provide an application 4*a*, 4*b* . . . 4*n* access to a selected device 10*a*, 10*b* and handle I/O requests from the application 4*a*, 4*b* . . . 4*n* to the device 10*a*, 10*b*. Upon receiving (at block 150) a request by an application to access a particular device 10*a*, 10*b*, the device driver 8 would check (at block 152) the reservation status of the device 10*a*, 10*b*, which may be indicated in the reservation status field 84 of the device table entry 80 for the requested device, to determine whether another process has a lock on the requested device 10*a*, 10*b* in a manner that would prevent the requested access. The reservation status may conform to the SCSI device reservations conflict handling techniques. In such case, the reservation status may be indicated in SCSI data structures, in lieu of or in addition to the reservation status field 84 in the entry 80 in the device table 22. If (at block 154) the requesting application 4*a*, 4*b* . . . 4*n* cannot reserve the device, e.g., such as the case if there is a reservation conflict, then the device driver 8 returns (at block 156) an error message that the requested device 10*a*, 10*b* cannot be accessed due to a reservation conflict. Otherwise, if the device 10*a*, 10*b* is available for the requested access, then the device driver 8 issues (at block 158) a reserve command to reserve the device 10*a*, 10*b* and the reservation status field 84 is updated (at block 160) to indicate reserved in the device table entry 80 for the requested device 10*a*, 10*b*. The device driver 8 would further send (at block 162) a command, such as SCSI commands, to provide the settings that the application uses for its requests to the device 10*a*, 10*b* for the blocksize and whether to use compression, wherein the blocksize and compression settings are updated in the field 88 in the device table entry 80 for the accessed device. Further, the current logical device address field 90 is updated to indicate the logical device address that the application 4*a*, 4*b* . . . 4*n* will use to access the device 10*a*, 10*b*.

After the application 4*a*, 4*b* . . . 4*n* is granted access to the requested device 10*a*, 10*b*, upon receiving (at block 180) an I/O request from the application 4*a*, 4*b* . . . 4*n* that reserved the device, the device driver 8 determines (at block 182) whether the current tape position can be determined from the device table entry. The current position may not be valid if non-sequential or random requests were issued or on the first I/O request from the application. If the current position can be determined, then the device driver 8 sends (at block 184) the I/O request to the device 10*a*, 10*b* using the path associated with the logical address used by the application 4*a*, 4*b* . . . 4*n* when sending the request. Otherwise if the position cannot be determined, then the device driver 8 issues (at block 186) a read position command to determine the current block ID and updates (at block 188) the current device position field 86 with the read position. If the current position cannot be determined, then the device driver 8 would still send (at block 184) the I/O request to perform the I/O request.

Upon determining (at block 190) that a request has completed, the device driver 8 increments (at block 192) the current device position 86 by the amount the tape head would have moved to perform the completed read/write operation. The device driver 8 may determine whether an I/O request has completed by receiving the requested data in response to a read request, receiving a complete message for a write request, or determining that a write request would have had to complete. A write request would have had to complete if write data is not buffered and the device accepts a further write request or if the buffer in a streaming device 10*a*, 10*b* would have had to complete a write operation to accept the further write request. In this way, the device table entry 80 for the device maintains the current device position 86 of the last completed read/write operation during a series of sequential read/write requests.

Figure 7:
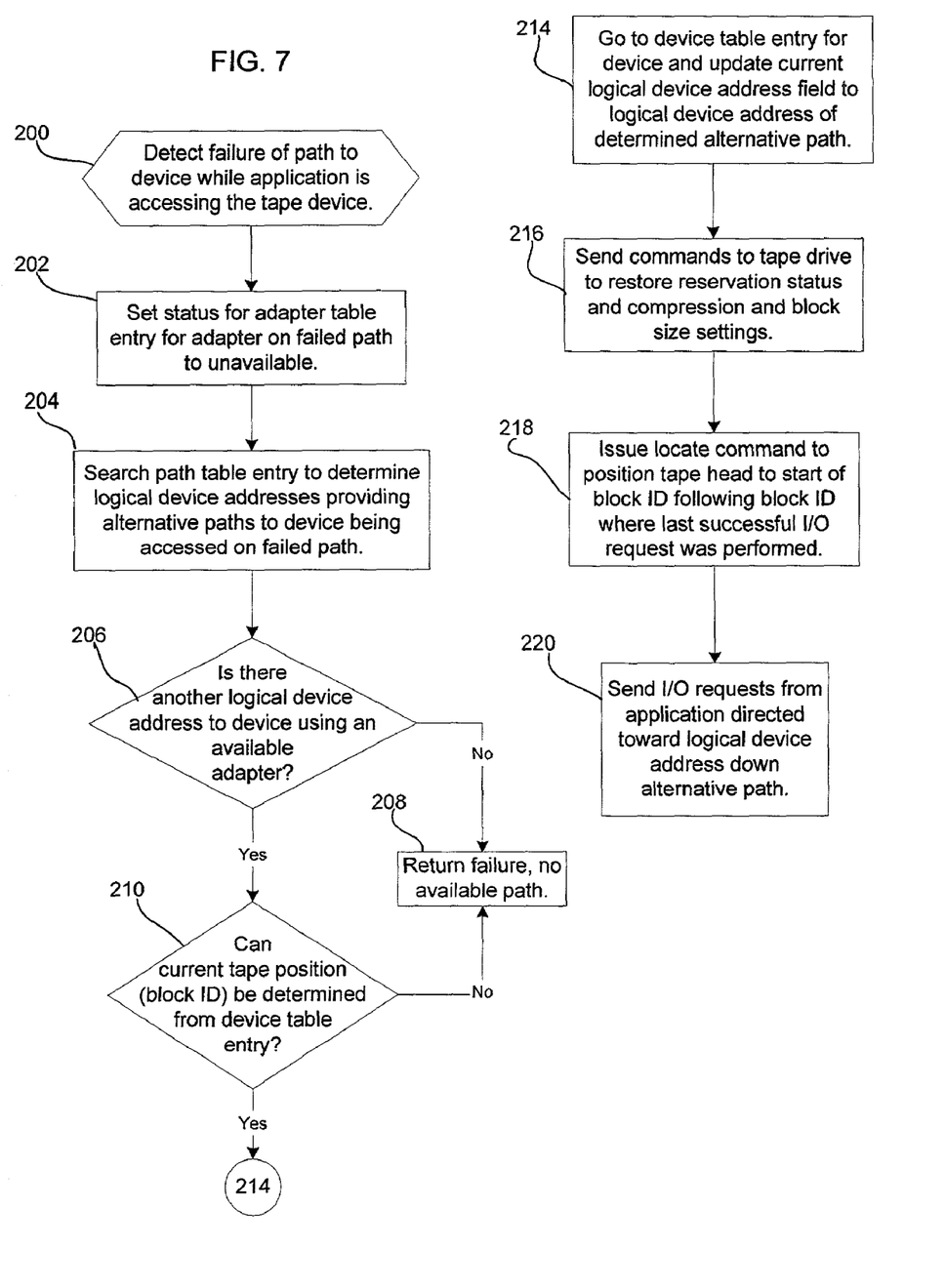
FIG. 7 illustrates logic to handle a failover in accordance with implementations of the invention.

FIG. 7 illustrates logic implemented in the device driver 8 to handle a failure of a device 10*a*, 10*b* that an application 4*a*, 4*b* . . . 4*n* is currently accessing and perform a failover to another available path to allow the application 4*a*, 4*b* . . . 4*n* to continue I/O processing from the point just before the failure occurred. Control begins at block 200 when the device driver 8 detects a failure of a path to a device 10*a*, 10*b* which one application 4*a*, 4*b* . . . 4*n* is currently accessing. As discussed, the failure may be due to a hardware or code error anywhere in the path, including the adapter, cable and/or device. The device driver 8 sets (at block 202) the status field 74 in the adapter table entry 70 of the adapter 12*a*, 12*b* providing the failed path. The device driver 8 searches (at block 204) the path table 18 for logical device addresses 52 providing alternative paths to the device 10*a*, 10*b* being accessed on the failed path, i.e., path table entries 50 having an alternative logical device address and the same device ID 64 of the device 10*a*, 10*b* being accessed on the failed path. At block 206 a determination is made of whether there is another logical device address to the currently accessed device 10*a*, 10*b* using an adapter 12*a*, 12*b* that is available, i.e., the status field 74 is indicated as available in the adapter entry 70 for an adapter indicated in the adapter field 60 of at least one of the path table entries determined at block 204. If there is no available adapter 12*a*, 12*b* providing an alternative path to the device 10*a*, 10*b*, then the device driver 8 returns failure to the application because there is no alternative available path to the device being accessed. Otherwise, if there is an alternative path, then the device driver 8 determines (at block 210) whether the current device position 86, e.g., current tape head position, can be determined from the device table entry 80 for the device being accessed. The device driver 8 may have lost track of the position if the application 4*a*, 4*b* . . . 4*n* submitted non-sequential I/O requests to the device 10*a*, 10*b* because, in certain implementations, the current device position 86 is predicated upon the assumption that completed I/O transactions are sequential.

If (at block 210) the current tape position cannot be determined, then failure is returned (at block 208). If (at block 210) the current device position, e.g., tape head position, can be determined, then the device driver 8 would access (at bock 214) the device table entry 80 for the requested device and update the current logical device address field 90 to the logical device address of the determined alternative path. Commands are sent (at block 216) to the tape drive to restore reservation status and compression and block size settings. The device driver 8 then issues (at block 218) a command, such as a SCSI LOCATE command, to move the device I/O mechanisms, e.g., tape head, to the start of the block ID following the block of the last successfully completed I/O request. The device driver 8 would then send (at block 220) any I/O requests from the application 4a, 4b . . . 4n toward the logical device address down the alternative path.

With the logic of FIG. 7, after performing a failover to an available path, the previously failed path may be fixed and become available again. Subsequently, the failover path may fail. In such case, the device driver 8 would perform the logic of FIG. 7 to perform a failback and use the path that previously failed path and was fixed.

Figure 8:
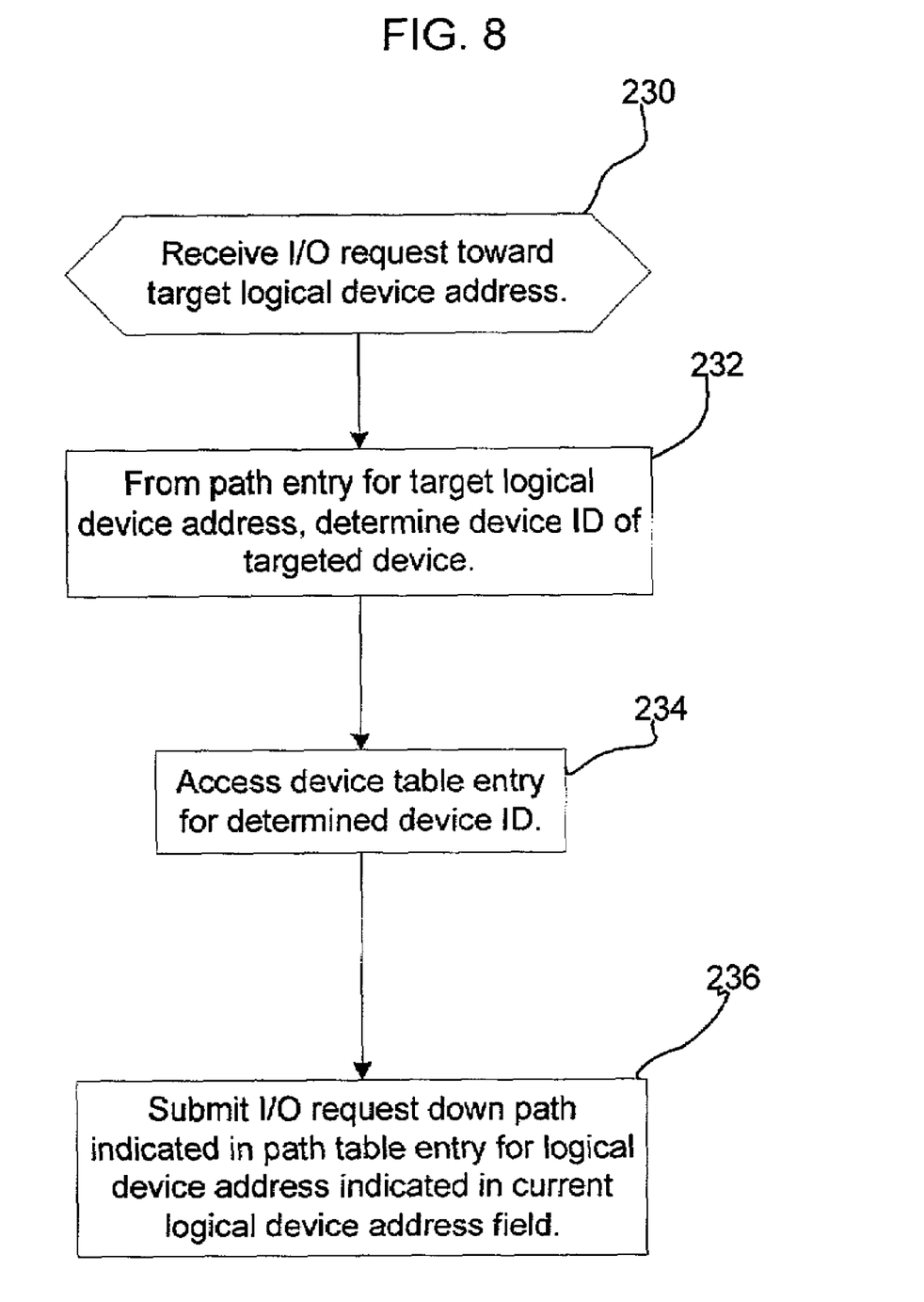
FIG. 8 illustrates logic to process I/O requests from applications in accordance with implementations of the invention.

FIG. 8 illustrates logic implemented in the device driver 8 to process application I/O requests to a target logical device address. Upon receiving (at block 230) an I/O request toward a target logical device address, the device driver 8 determines (at block 232) the device ID from the device ID field 64 of the path table entry 50 for the target logical device address. The device driver 8 would then access (at block 234) the device table entry 80 for the device ID, i.e., having the device ID in device ID field 82. The device driver 8 would submit (at block 236) the I/O request down the path indicated in the path info field 62 of the path table entry 50 for the logical device address indicated in the current logical device address field 90 in the accessed device table entry 80. The logical device address indicated in the field 90 may be different than the target logical device address if there has been a failover and change of paths when implementing the logic of FIG. 7 during a failure of a path or when implementing the load balancing logic of FIG. 9.

Figure 9:
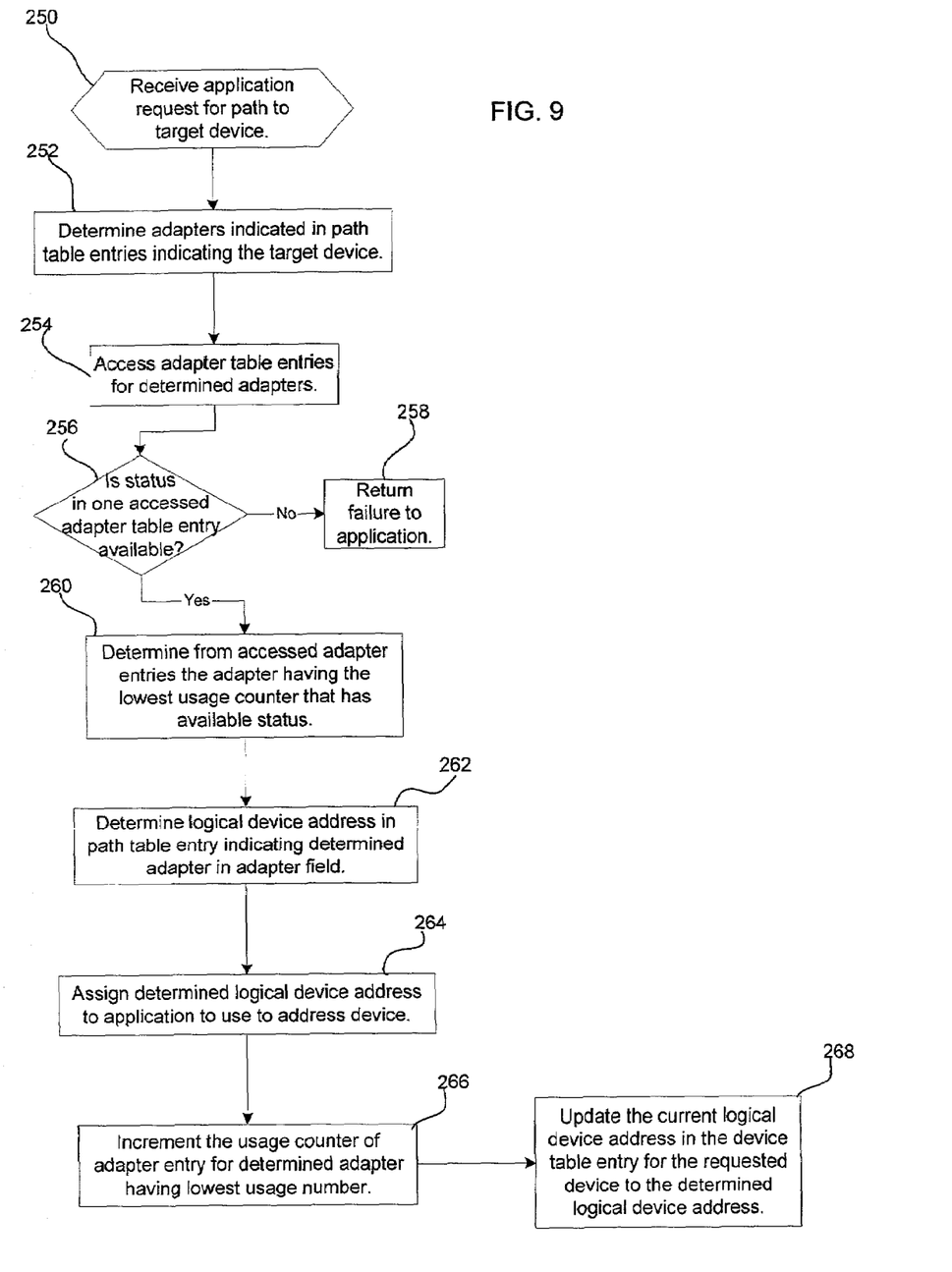
FIG. 9 illustrates logic to select a path for an application to use to access a device in accordance with implementations of the invention.

FIG. 9 illustrates logic implemented in the device driver 8 to perform load balancing to select a adapter 12a, 12b to access a device 10a, 10b. Blocks 250–268 illustrate logic implemented in the device driver 8 to select an adapter, i.e., logical device address, for an application 4a, 4b . . . 4n requesting access to a device in a matter that load balances the assignment of applications to logical device addresses based on the information in the adapter table 70. An adapter 12a, 12b may be used to provide paths to multiple devices, such as multiple SCSI devices linked together or separate LUNs in a same storage device. Thus, the load balancing across adapters may be performed with respect to different types of target devices that host applications 4a, 4b . . . 4n may want to access. Alternatively, the host applications 4a, 4b . . . 4n may all be using the adapters 12a, 12b to access the same type of device 10a, 10b, such as a tape drive. At block 250, the device driver 8 receives an application 4a, 4b . . . 4n request for a logical device address to use to access a device 10a, 10b. The device driver 8 determines (at block 252) the target adapters 12a, 12b that may be used to access the requested device 10a, 10b, which may be determined from the adapter field 60 in the path table 18 entries having the device ID of the requested device 10a, 10b in field 64.

After determining the adapters 12a, 12b that are capable of providing access to the requested device 10a, 10b, the device driver 8 accesses (at block 254) the adapter table entries 70 for the determined adapters 12a, 12b, and determines (at block 256) whether the status field 74 for at least one accessed entry is "available". If not, failure is returned (at block 258) to the application 4a, 4b . . . 4n because there is no currently available adapter providing a path to the requested device 10a, 10b. If one adapter has available status, then the device driver 8 determines (at block 260) from the accessed adapter table entries 70 the adapter 12a, 12b (identified by the adapter entry 70) having the lowest usage counter 76 value and that has an "available status 74. The device driver 8 then determines (at block 262) the logical device address to the requested device using the determined least used adapter 12a, 12b. The logical device address may be determined from the logical device address field 52 in the path table entry 50 having the device ID of the requested device in the device ID field 64 and the determined lowest use adapter 12a, 12b in the adapter field 60. The determined logical device address is assigned (at block 264) to the application 4a, 4b . . . 4n to use to access the requested device and the usage counter 76 in the adapter table entry 70 for the determined least used adapter 12a, 12b is incremented (at block 266). Further, the current logical device address field 90 in the device table entry 80 for the requested device 10a, 10b would be updated (at block 268) with the determined logical device address that will be used to access the requested device 10a, 10b.

The load balancing logic of FIG. 9 may be used to select a failover path if there are more than two paths to a device. In such case, if one path fails, then the device driver 8 may use the load balancing logic of FIG. 9 to select a failover path of the two or more surviving paths. If the failed path is fixed and another path subsequently fails, then the device driver 8 may execute the logic of FIG. 9 to failback to the path that previously failed and is now fixed or failover to another path that has not yet failed, depending on the current usage of the available paths.

The described implementations provide techniques for maintaining information on multiple paths to a device, such as sequential access devices including tape drives, and using such information to select a path for an application to use to access the sequential access device. Further, the described implementations, provide techniques for performing a failover when there are multiple paths to a sequential access device in a manner that allows the application to continue sending sequential I/O requests from the point where the failure occurred, and without having to restart from where the sequential I/O requests began. Yet further implementations provide techniques to use the path information to load balance the selection of one of multiple adapters to use to access a requested device.

Additional Implementation Details

The path selection techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In certain implementations, the device being accessed is a sequential access device, such as a tape drive. In alternative implementations, the described path selection implementations may be used to select paths to any type of I/O device known in the art, including non-sequential access devices.

In the described implementations, the path selection operations were performed by a device driver 8 managing application access to the multiple paths to the devices. In alternative implementations, some or all of the operations described as performed by the device driver 8 may be performed by other program components in the host, such as the applications.

The described FIG. 1 shows two adapters providing two paths to each of two devices. However, the host may include any number of adapters to provide any number of paths to any combination of the attached one or more devices. For instance, the host may include more than two adapters providing paths to one or more devices. Further, the devices may be of a same or different type of I/O device, e.g., tape drive, tape library, medium changer, or mixed types of devices, e.g., tape drive, disk drives, printers, storage arrays, etc. Further, each adapter may provide connection to multiple devices, such as linked SCSI devices or devices linked in a loop architecture, such as the Serial Storage Architecture (SSA) or a Fibre Channel Arbitrated Loop.

In the described implementations, the current device position indicates the position of an Input/output (I/O) mechanism of the device while accessing a medium. For instance, if the device is a tape drive then the I/O mechanism would comprise the read/write head and the current position comprises the block ID on the tape medium that the read/write head is accessing. In alternative implementation, the Input/Output mechanism of the device may be performing I/O with respect to different types of media. For instance, if the I/O mechanism is a printer, then the media being accessed would be the paper on which output is being rendered.

In the described implementations, the device driver maintained data to perform the failover and select paths in three separate tables 18, 20, 22, where each entry in the tables has specific described fields. In further implementations, the entries in the tables may have a different arrangement of fields and include additional information. Moreover, the information described as included in the tables may be maintained in any type of data structure or data object, including structures other than tables. Moreover, the information described as included in the three tables 18, 20, and 22 may be consolidated into fewer tables or objects or distributed across more than three tables or objects.

The logic of FIGS. 5–9 describes specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for selecting a path to a device to use when sending data requests to the device with respect to a storage medium accessed by the device, comprising:
   submitting data requests to the device on a first path;
   maintaining device information indicating a position on the storage medium currently being accessed by a data transfer mechanism of the device that accesses the storage medium to execute the submitted data request;
   selecting a second path to the device if the first path fails;
   submitting data requests to the indicated position at the device on the selected second path;
   sending a command to the device to determine a current position of the device if the position indicated in the device information is incorrect or unavailable; and
   updating the position indicated in the device information with the current position returned in response to the command before submitting the data requests to the indicated position.

2. The method of claim 1, wherein data requests following a last successfully completed data access request are submitted to the indicated position at the device.

3. The method of claim 1, wherein the data request comprises a sequential access request.

4. The method of claim 3, wherein the data request comprises an Input/Output request, and wherein the device comprises an Input/Output device.

5. The method of claim 4, wherein the position indicates a location on the storage medium of the data transfer mechanism after completing a last known completed I/O request, wherein submitting data requests to the indicated position comprises submitting sequential I/O requests from the last known completed I/O request, and wherein the data transfer mechanism performs the I/O request on the storage medium starting from the position indicated in the device information.

6. The method of claim 5, further comprising:
   submitting a command to move the mechanism to the indicated position before submitting the sequential I/O requests from the last known completed I/O request.

7. The method of claim 1, further comprising:
   maintaining path information on paths to the device, wherein the path information is used to select the first and second paths to the device.

8. The method of claim 1, further comprising:
   incrementing the position after determining that one data access request completed.

9. The method of claim 8, wherein the device comprises a sequential access Input/Output device, and wherein incrementing the position comprises incrementing the position by an amount of data transmitted with the completed I/O request.

10. The method of claim 1, wherein the data access requests are submitted by an application, wherein a device driver maintains the device information and selects the first and second paths, and wherein the application uses logical device addresses to submit I/O requests on the selected paths to the device.

11. The method of claim 1, further comprising:
maintaining path information indicating a logical address to the device and a physical path associated with the logical address, wherein data requests are directed to a target logical address; and
maintaining device information indicating the logical address used to access the device, wherein the device information is associated with at least one logical address, wherein data requests submitted to the target logical address are transmitted on the path indicated in the path information associated with the logical address indicated in the device information associated with the target logical address.

12. The method of claim 11, wherein the first path is associated with a first logical address and the second path is associated with a second logical address, wherein the first logical address is the target logical address, further comprising:
updating the device information associated with the first logical address to indicate the second logical address after selecting the second path, wherein data requests submitted to the first logical address are transmitted to the second path associated with the second logical address indicated in the device information associated with the first logical address.

13. A method for selecting a path to at least one device having a storage medium and a data transfer mechanism that access data in the storage medium, comprising:
maintaining information indicating usage by applications of adapters to access the at least one device, wherein the adapters provide multiple paths to the at least one device;
receiving a request from an application to access a target device comprising one of the at least one device;
using the information indicating the usage of the adapters to select one path to the target device that utilizes one adapter having a lowest usage; and
switching the path the application uses to access the target device to the selected path by updating a logical device address used to access the target device to indicate the selected path;
assigning the updated logical device address to the application to use to submit multiple requests to the target device;
maintaining device information indicating a position on the storage medium currently being accessed by the data transfer mechanism to execute the submitted request, wherein the application submits data requests to the indicated position at the updated logical device address assigned to the application;
sending a command to the device to determine a current position of the device if the position indicated in the device information is incorrect or unavailable; and
updating the position indicated in the device information with the current position returned in response to the command before submitting the data requests to the indicated position.

14. The method of claim 13, wherein the device comprises a sequential access device.

15. The method of claim 13, wherein the adapters provide paths to multiple instances of the target device, wherein selection of the path determines the target device that the application will access.

16. A system for selecting a path to a device to use when sending data requests to the device with respect to a storage medium accessed by the device, wherein the device includes a data transfer mechanism, comprising:
means for submitting data requests to the device on a first path;
means for maintaining device information indicating a position on the storage medium currently being accessed by the data transfer mechanism;
means for selecting a second path to the device if the first path fails;
means for submitting data requests to the indicated position at the device on the selected second path;
means for sending a command to the device to determine a current position of the device if the position indicated in the device information is incorrect or unavailable; and
means for updating the position indicated in the device information with the current position returned in response to the command before submitting the data requests to the indicated position.

17. The system of claim 16, wherein data requests following a last successfully completed data access request are submitted to the indicated position at the device.

18. The system of claim 16, wherein the position indicates a location on the storage medium of the data transfer mechanism after completing a last known completed I/O request, wherein the means for submitting data requests to the indicated position submits sequential I/O requests from the last known completed I/O request, wherein the data transfer mechanism performs the I/O request on the storage medium starting from the position indicated in the device information.

19. The system of claim 18, further comprising:
means for submitting a command to move the mechanism to the indicated position before submitting the sequential I/O requests from the last known completed I/O request.

20. The system of claim 16, further comprising:
means for maintaining path information indicating a logical address to a device and a physical path associated with the logical address, wherein data requests are directed to a target logical address; and
means for maintaining device information indicating the logical address used to access the device, wherein the device information is associated with at least one logical address, wherein data requests directed to the target logical address are transmitted on the path indicated in the path information associated with the logical address indicated in the device information associated with the target logical address.

21. A system for selecting a path to at least one device including a target device, a storage medium and a data transfer mechanism that accesses data in the storage medium, comprising:
adapters;
means for maintaining information indicating usage by applications of the adapters to access at least one device, wherein the adapters provide multiple paths to the at least one device;
means for receiving a request from an application to access the target device;
means for using the information indicating the usage of the adapters to select one path to the target device that utilizes one adapter having a lowest usage; and
means for switching the path the application uses to access the target device to the selected path by updating a logical device address used to access the target device to indicate the selected path, wherein the updated logical device address is assigned to the application to use to submit multiple requests to the target device;

means for maintaining device information indicating a position on the storage medium currently being accessed by the data transfer mechanism to execute the submitted request, wherein the application submits data requests to the indicated position at the updated logical device address assigned to the application;

means for sending a command to the device to determine a current position of the device if the position indicated in the device information is incorrect or unavailable; and means for updating the position indicated in the device information with the current position returned in response to the command before submitting the data requests to the indicated position.

22. The system of claim 21, wherein the adapters provide paths to multiple instances of the target device, wherein the means for selecting the path determines the target device that the application will access.

23. A computer readable storage including executable code for selecting a path to a device to use when sending data requests to the device with respect to a storage medium accessed by the device, wherein the device includes a data transfer mechanism, wherein the executed code causes operations to be performed, the operations comprising:

submitting data requests to the device on a first path;

maintaining device information indicating a position on the storage medium currently being accessed by the data transfer mechanism;

selecting a second path to the device if the first path fails;

submitting data requests to the indicated position at the device on the selected second path;

sending a command to the device to determine a current position of the device if the position indicated in the device information is incorrect or unavailable; and updating the position indicated in the device information with the current position returned in response to the command before submitting the data requests to the indicated position.

24. The computer readable storage of claim 23, wherein data requests following a last successfully completed data access request are submitted to the indicated position at the device.

25. The computer readable storage of claim 23, wherein the data request comprises a sequential access request.

26. The computer readable storage of claim 25, wherein the data request comprises an Input/Output request, wherein the device comprises an Input/Output device.

27. The computer readable storage of claim 26, wherein the position indicates a location on the storage medium of the data transfer mechanism after completing a last known completed I/O request, wherein submitting data requests to the indicated position comprises submitting sequential I/O requests from the last known completed I/O request, and wherein the data transfer mechanism performs the I/O request on the storage medium starting from the position indicated in the device information.

28. The computer readable storage of claim 27, wherein the operations further comprise:

submitting a command to move the mechanism to the indicated position before submitting the sequential I/O requests from the last known completed I/O request.

29. The computer readable storage of claim 23, wherein the operations further comprise:

maintaining path information on paths to the device, wherein the path information is used to select the first and second paths to the device.

30. The computer readable storage of claim 23, wherein the operations further comprise:

incrementing the position after determining that one data access request completed.

31. The computer readable storage claim 30, wherein the device comprises a sequential access Input/Output device, and wherein incrementing the position comprises incrementing the position by an amount of data transmitted with the completed I/O request.

32. The computer readable storage of claim 23, wherein the data access request are submitted by an application, wherein a device driver maintains the device information and selects the first and second paths, and wherein the application uses logical device addresses to submit I/O requests on the selected paths to the device.

33. The computer readable storage of claim 23, wherein the operations further comprise:

maintaining path information indicating a logical address to the device and a physical path associated with the logical address, wherein data requests are directed to a target logical address; and maintaining device information indicating the logical address used to access the device, where the device information is associated with at least one logical address, wherein data request submitted to the target logical address are transmitted on the path indicated in the path information associated with the logical address indicated in the device information associated with the target local address.

34. The computer readable storage of claim 33, wherein the first path is associated with a first logical address and the second path is associated with a second logical address, wherein the first logical address is the target logical address, and wherein the operation further comprises:

updating the device information associated with the first logical address to indicate the second logical address after selecting the second path, wherein data request submitted to the first logical address are transmitted to the second path associated with the second logical address indicated in the device information associated with the first logical address.

35. A computer readable storage including executable code for selecting a path to at least one device having a storage medium and a data transfer mechanism that access data in the storage medium, wherein the code is executed to cause operations to be performed, the operations comprising:

maintaining information indicating usage by applications of adapters to access the at least one device, wherein the adapters provide multiple paths to the at least one device;

receiving a request from an application to access a target device comprising one of the at least one device;

using the information indicating the usage of the adapters to select one path to the target device that utilizes one adapter having a lowest usage;

switching the path the application uses to access the target device to the selected path by updating a logical device address used to access the target device to indicate the selected path, wherein the updated logical device address is assigned to the application to use to submit multiple requests to the target device;

maintaining device information indicating a position on the storage medium currently being accessed by the data transfer mechanism to execute the submitted request, wherein the application submits data requests to the indicated position at the updated logical device address assigned to the application;

sending a command to the device to determine a current position of the device if the position indicated in the device information is incorrect or unavailable; and updating the position indicated in the device information with the current position returned in response to the command before submitting the data requests to the indicated position.

36. The computer readable storage of claim 35, wherein the device comprises a sequential access device.

37. The computer readable storage of claim 35, wherein the adapters provide paths to multiple instances of the target device, wherein selection of the path determines the target device that the application will access.

* * * * *